United States Patent
Ashida

(10) Patent No.: US 10,129,475 B2
(45) Date of Patent: Nov. 13, 2018

(54) IMAGE CAPTURING APPARATUS AND METHOD OF CONTROLLING AN IMAGE CAPTURING APPARATUS

(71) Applicant: CANON KABUSHIKI KAISHA, Tokyo (JP)

(72) Inventor: Yuuichirou Ashida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/457,533

(22) Filed: Mar. 13, 2017

(65) Prior Publication Data

US 2017/0280057 A1 Sep. 28, 2017

(30) Foreign Application Priority Data

Mar. 23, 2016 (JP) ................. 2016-058493

(51) Int. Cl.
| | |
|---|---|
| *H04N 5/232* | (2006.01) |
| *H04N 5/235* | (2006.01) |
| *H04N 9/04* | (2006.01) |
| *H04N 5/351* | (2011.01) |
| *H04N 5/238* | (2006.01) |
| *H04N 9/07* | (2006.01) |

(52) U.S. Cl.
CPC ......... *H04N 5/23245* (2013.01); *H04N 5/232* (2013.01); *H04N 5/238* (2013.01); *H04N 5/2351* (2013.01); *H04N 5/2353* (2013.01); *H04N 5/23212* (2013.01); *H04N 5/23219* (2013.01); *H04N 5/23229* (2013.01); *H04N 5/351* (2013.01); *H04N 9/045* (2013.01); *H04N 9/07* (2013.01)

(58) Field of Classification Search
CPC ........... H04N 5/23245; H04N 5/23229; H04N 5/2351; H04N 5/23219; H04N 5/23212; H04N 9/045; H04N 5/351; H04N 5/238; H04N 5/2353; H04N 5/232; H04N 9/07
USPC ........... 348/208.1–208.3, 345–357, 241, 242
See application file for complete search history.

(56) References Cited

U.S. PATENT DOCUMENTS

| | | | | |
|---|---|---|---|---|
| 2003/0156206 | A1* | 8/2003 | Ikeda | ........................ H04N 9/73 348/223.1 |
| 2005/0212950 | A1* | 9/2005 | Kanai | ................. H04N 5/23212 348/345 |
| 2011/0115967 | A1* | 5/2011 | Lee | .................... H04N 5/23212 348/349 |

(Continued)

FOREIGN PATENT DOCUMENTS

JP 2012-034130 A 2/2012

*Primary Examiner* — Albert Cutler
(74) *Attorney, Agent, or Firm* — Canon U.S.A., Inc. IP Division

(57) ABSTRACT

An image capturing apparatus includes an image sensor and a processor. The image sensor includes an imaging plane that receives an image of a shooting target field through color filters according to two or more wavelength regions and outputs a signal of the image of the shooting target field. The processor is configured to set a larger weight for a wavelength region having a higher image forming performance than for a wavelength region having a lower image forming performance in accordance with a high-resolution direction determined in the image of the shooting target field, generate image data based on the signal output by the image sensor, and detect an object in the generated image data.

8 Claims, 8 Drawing Sheets

(56) References Cited

U.S. PATENT DOCUMENTS

2011/0157382 A1* 6/2011 Miyasako ............... G03B 5/00
　　　　　　　　　　　　　　　　　　　　　348/208.5
2014/0099005 A1* 4/2014 Mogi ................. G06K 9/00288
　　　　　　　　　　　　　　　　　　　　　382/118

* cited by examiner

FIG. 7A

| S14 | S13 | S12 | S11 | S12 | S13 | S14 |
|-----|-----|-----|-----|-----|-----|-----|
| S24 | S23 | S22 | S21 | S22 | S23 | S24 |
| S34 | S33 | S32 | S31 | S32 | S33 | S34 |
| S44 | S43 | S42 | S41 | S42 | S43 | S44 |
| S34 | S33 | S32 | S31 | S32 | S33 | S34 |
| S24 | S23 | S22 | S21 | S22 | S23 | S24 |
| S14 | S13 | S12 | S11 | S12 | S13 | S14 |

|    | S11 | S12 | S13 | S14 | S21 | S22 | S23 | S24 | S31 | S32 | S33 | S34 | S41 | S42 | S43 | S44 |
|----|-----|-----|-----|-----|-----|-----|-----|-----|-----|-----|-----|-----|-----|-----|-----|-----|
| Wr | 0.26 | 0.28 | 0.32 | 0.38 | 0.28 | 0.30 | 0.35 | 0.40 | 0.29 | 0.33 | 0.39 | 0.45 | 0.30 | 0.36 | 0.43 | 0.50 |
| Wg | 0.38 | 0.39 | 0.41 | 0.39 | 0.39 | 0.39 | 0.40 | 0.39 | 0.40 | 0.40 | 0.40 | 0.41 | 0.42 | 0.41 | 0.41 | 0.40 |
| Wb | 0.36 | 0.33 | 0.27 | 0.23 | 0.33 | 0.31 | 0.25 | 0.21 | 0.31 | 0.27 | 0.21 | 0.13 | 0.28 | 0.23 | 0.16 | 0.10 |

|    | S11 | S12 | S13 | S14 | S21 | S22 | S23 | S24 | S31 | S32 | S33 | S34 | S41 | S42 | S43 | S44 |
|----|-----|-----|-----|-----|-----|-----|-----|-----|-----|-----|-----|-----|-----|-----|-----|-----|
| Wr | 0.50 | 0.45 | 0.40 | 0.38 | 0.43 | 0.39 | 0.35 | 0.32 | 0.36 | 0.30 | 0.30 | 0.28 | 0.30 | 0.29 | 0.28 | 0.26 |
| Wg | 0.40 | 0.41 | 0.39 | 0.39 | 0.41 | 0.40 | 0.40 | 0.41 | 0.41 | 0.41 | 0.39 | 0.39 | 0.42 | 0.40 | 0.39 | 0.38 |
| Wb | 0.10 | 0.13 | 0.21 | 0.23 | 0.16 | 0.21 | 0.25 | 0.27 | 0.23 | 0.29 | 0.31 | 0.33 | 0.28 | 0.31 | 0.33 | 0.36 |

IMAGE CAPTURING APPARATUS AND METHOD OF CONTROLLING AN IMAGE CAPTURING APPARATUS

BACKGROUND OF THE INVENTION

Field of the Invention

The present invention relates to an image capturing apparatus configured to detect an object, a control method of the image capturing apparatus, and a non-transitory computer-readable medium.

Description of Related Art

In recent years, many image capturing apparatuses that detect an object such as a person present in a shooting target field and perform focus adjustment of an image pickup lens with respect to the object have been put on the market.

Generally, detection of an object is performed on the basis of information from an image sensor constituted by, for example, a complementary metal oxide semiconductor (CMOS) or a charge coupled device (CCD). However, in recent years, a single-lens reflex (SLR) camera that employs an image sensor constituted by a CMOS, a CCD, or the like as a photometric sensor for measuring the luminance of the shooting target field has been put on the market, and this single-lens reflex camera not only measures the luminance but also detects a human face and the like. Focus adjustment of the image pickup lens can be automatically performed with respect to the object by transmitting information about the detection result to a known focus detection unit employing a phase difference detection method.

However, from the viewpoint of the size or cost of the camera, it is difficult to impart a photometric optical element (photometric lens) for forming an image on the photometric sensor with an image forming performance in which chromatic aberration and other like aberrations are sufficiently suppressed.

Therefore, in the case of detecting an object by using a photometric optical element and a photometric sensor, it is sometimes difficult to achieve a high image forming performance, and thus a way to improve the performance of object detection is sought.

Japanese Patent Laid-Open No. 2012-34130 discloses an example in which, in order to suppress deterioration of image quality due to a change in temperature of an optical system, an image processing circuit preemptively converts a change in an image forming state of the optical system occurring due to a change in temperature into weights Wr, Wg, and Wb for respective primary color signals of R, G, and B and stores these weights for image processing. In this known technique to suppress deterioration of image quality due to a change in temperature of an optical system, the weights Wr, Wg, and Wb are set in response to an output from a temperature measuring element, and the respective primary color signals of R, G, and B are combined by using the weights to generate a signal in which an effect of aberration is suppressed.

The above-described technique only takes into consideration the change in the image forming state of the optical system occurring due to the change in temperature. However, aberration that may cause the deterioration of resolution actually occurs also due to a field curvature, astigmatism, and other like parameters, and the aberration occurring due to these additional factors also has to be suppressed.

SUMMARY OF THE INVENTION

According to an aspect of the exemplary embodiments of the present patent application, an image capturing apparatus includes an image sensor and a processor. The image sensor is configured to include an imaging plane that receives an image of a shooting target field through color filters according to two or more wavelength regions and output a signal of the image of the shooting target field. The processor is configured to set a larger weight for a wavelength region having a higher image forming performance than for a wavelength region having a lower image forming performance in accordance with a high-resolution direction determined in the image of the shooting target field, generate image data based on the signal output by the image sensor, and detect an object in the generated image data.

According to another aspect of the exemplary embodiments of the present patent application, an image capturing apparatus includes an image sensor, a detection circuit, and a processor. The image sensor is configured to include an imaging plane that receives an image of a shooting target field through color filters according to two or more wavelength regions and output a signal of the image of the shooting target field. The detection circuit is configured to detect an attitude of the image capturing apparatus. The processor is configured to set weights for the two or more wavelength regions in accordance with the attitude of the image capturing apparatus detected by the detection circuit, generate image data based on the signal output by the image sensor, and detect an object in the generated image data.

Further features of the present invention will become apparent from the following description of exemplary embodiments with reference to the attached drawings.

BRIEF DESCRIPTION OF THE DRAWINGS

FIG. 7A illustrates regions each assigned with an identification code, FIG. 7B illustrates a first weighting table, and FIG. 7C illustrates a second weighting table.

DESCRIPTION OF THE EMBODIMENTS

An exemplary embodiment of the present invention will be described below with reference to attached drawings.

Figure 1:
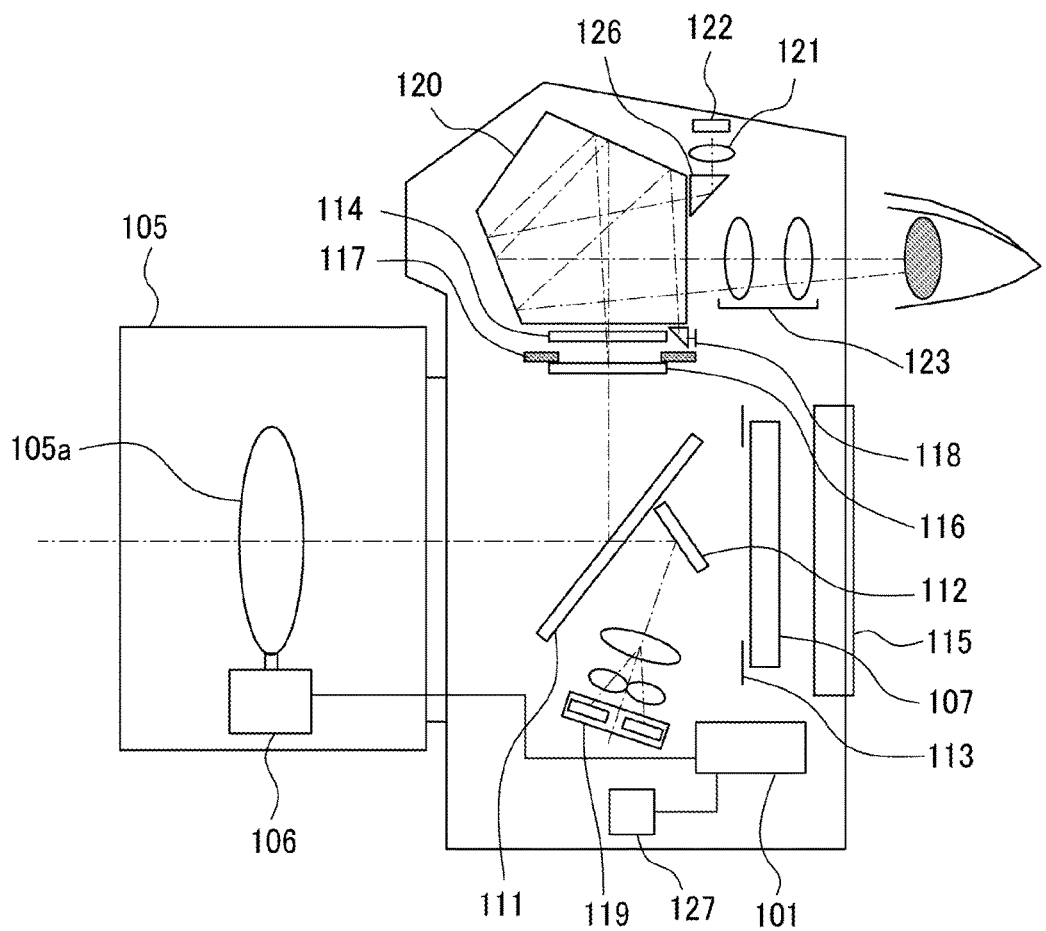
FIG. 1 schematically illustrates an inner configuration of a camera.

First, a single-lens reflex camera according to the present exemplary embodiment will be described with reference to FIG. 1. FIG. 1 schematically illustrates an inner configuration of the single-lens reflex camera according to the present exemplary embodiment. The single-lens reflex camera serves as an exemplary image capturing apparatus. The single-lens reflex camera according to the present exemplary embodiment will be hereinafter simply referred to as a camera according to the present exemplary embodiment.

A central processing unit (CPU) 101 controls operations of the camera.

A lens unit 105 includes an image pickup lens 105a and a lens control circuit 106, and focuses photographic object light on an image sensor 107. Although the image pickup lens 105a is expressed as a single lens in FIG. 1 for the sake of convenience, the image pickup lens 105a is actually constituted by plural lenses and the focus position thereof can be adjusted by moving the lenses with the lens control circuit 106.

The lens control circuit 106 adjusts an aperture stop, an in-focus position, and so forth of the lens unit 105 in accordance with an instruction from the CPU 101.

The image sensor 107 is an image sensor constituted by a CMOS, a CCD, or the like. A portion of input light beam passes through a main mirror 111, which is a half mirror, and is guided to a focus detection unit 119 through a sub mirror 112. A focal plane shutter 113 is disposed in front of the image sensor 107. An external display apparatus 115 is a display configured as a thin film transistor (TFT) color liquid crystal display (LCD) or an organic electroluminescent (EL) display.

A focus detection plate (hereinafter referred to as a focusing plate) 116 is disposed at an image forming plane of the lens unit 105 equivalent to an image forming plane of the image sensor 107, and an image of the shooting target field is reflected on the main mirror 111 and focused on the focusing plate 116 as a primary image. A photographer can view the image of the shooting target field through a pentaprism 120 and an eyepiece lens 123, that is, a through-the-lens (TTL) system is employed for the configuration of an optical finder.

A finder field frame 117 is used for shielding light of a peripheral portion of the object light beam to let the photographer visually recognize a region (image capturing region) to be captured by the image sensor 107. A polymer network liquid crystal (hereinafter referred to as PN liquid crystal) panel 114 is used for showing the photographer looking through the optical finder a screen displaying a condition of focus detection operation by a focus detection unit 119 and informing the photographer of a focus detection region. An in-finder display 118 is used for informing the photographer of various shooting information of the camera, such as an aperture value and a shutter speed, via a light guide prism, the pentaprism 120, and the eyepiece lens 123.

A light path of the image of the shooting target field formed on the focusing plate 116 is bent by a photometric prism 126. The image of the shooting target field is formed on a photometric sensor 122, which is an image sensor for photometry, as a secondary image via a photometric lens 121. Details of the photometric lens 121 and the photometric sensor 122 will be described later. The photometric sensor 122 serves as an example of an image capturing unit according to the present invention, and the photometric prism 126 is an example of a changing unit according to the present invention.

An attitude detection circuit 127 is constituted by an acceleration sensor (accelerometer), a gyroscope and so forth, and detects the attitude of the camera. The attitude detection circuit 127 serves as an example of an attitude detection unit according to the present invention.

Figure 2:
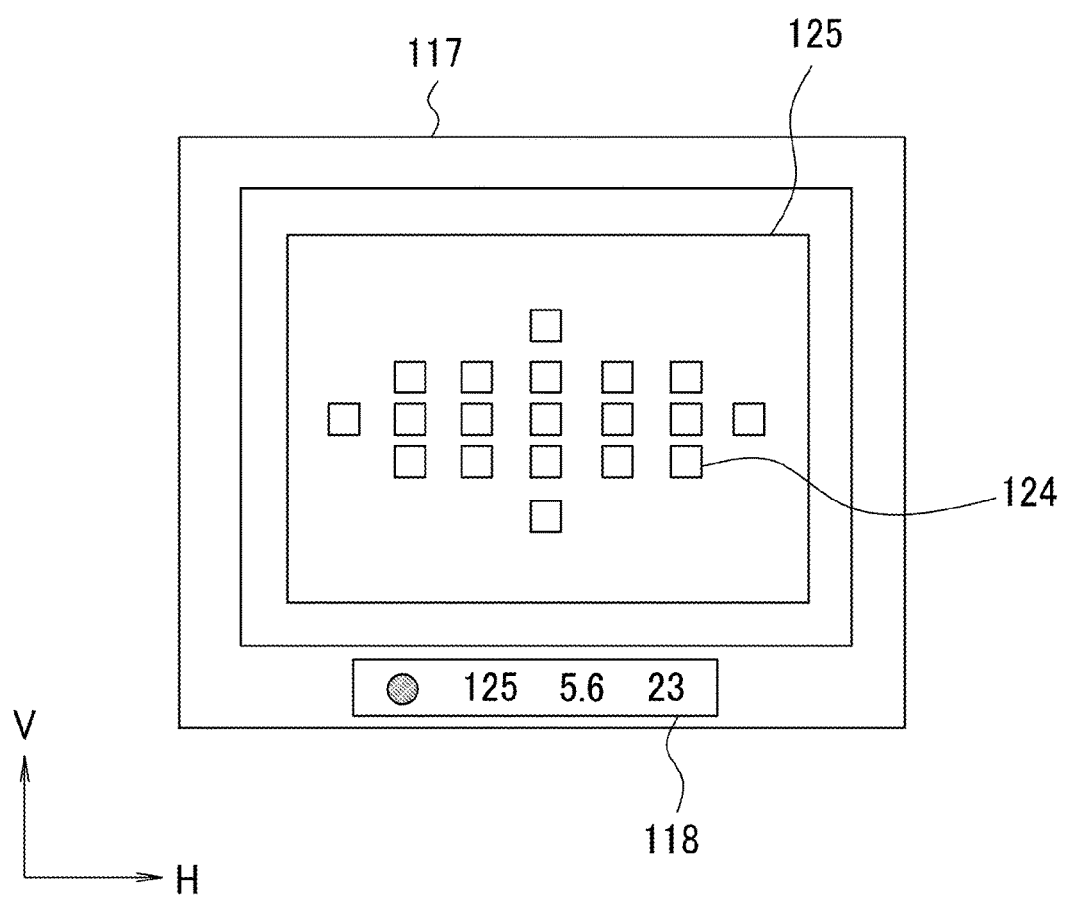
FIG. 2 illustrates a relationship between a finder field frame, a focus detection region, and a photometry region.

The focus detection unit 119 performs a focus detection operation via a known phase difference detection method, and performs an autofocusing (AF) operation, in which the lens unit 105 is automatically driven to a focusing position of the object. The focus detection operation can be generally performed for plural regions, and, in the present exemplary embodiment, 19 points of focus detection regions 124 are arranged to cover the center, upper, lower, left, and right portions of an imaging area as illustrated in FIG. 2.

In the case where plural focus detection regions are present as in this case, there are two methods (known as arbitrary selection and automatic selection) of selecting a focus detection region for the photographer. In the arbitrary selection, the photographer arbitrarily selects one focus detection region corresponding to a position that the photographer desires to be focused on in the imaging area. In the automatic selection, a focus detection region is automatically selected in accordance with a certain algorism on the basis of a detection result of a focusing state of each focus detection region. In a typical focus detection operation of automatic selection, the focus position of the lens unit 105 is adjusted, on the basis of a defocus amount calculated for each focus detection region, to focus on an object that is at the position closest to the photographer (camera) or an object with the largest brightness difference (highest contrast) among objects included in the focus detection regions. This operation of automatic selection will be referred to as a normal automatic selection operation. In addition, in one focus detection operation of automatic selection, the focus position of the lens unit 105 is adjusted on the basis of a defocus amount of a focus detection region corresponding to a position of a face of a person in the case where it is determined that a person is present in the shooting target field on the basis of an object detection result that will be described later. This automatic selection operation based on the object detection result will be referred to as an object-detection-prioritized automatic selection operation.

Next, the relationship between the finder field frame 117, the 19 points of focus detection regions 124, and the photometric region 125 will be described with reference to FIG. 2. FIG. 2 illustrates the relationship between the finder field frame 117, the 19 points of focus detection regions 124, and the photometric region 125. The 19 points of focus detection regions 124 are displayed in the finder field frame 117 by the PN liquid crystal panel 114. For example, when one of the 19 points of focus detection regions 124 is arbitrarily selected, only the selected focus detection region 124 is displayed, and the other 18 points of focus detection regions 124 are not displayed. Thus, the photographer visually recognizes only the selected focus detection region 124.

Figure 3:
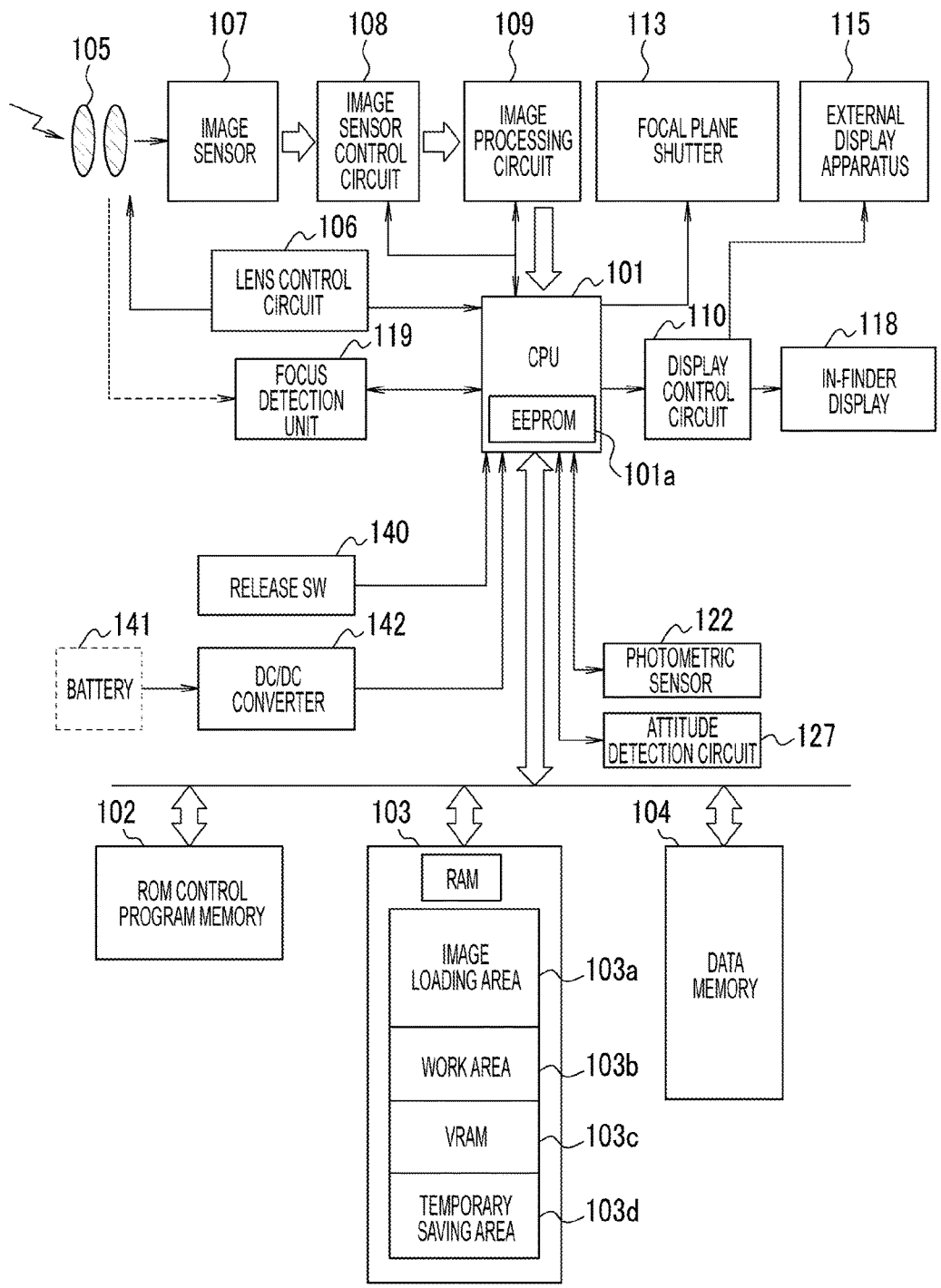
FIG. 3 is a block diagram schematically illustrating a configuration of the camera.

Next, the configuration of the camera according to the present exemplary embodiment will be described with reference to FIG. 3. FIG. 3 is a block diagram schematically illustrating a configuration of the camera according to the present exemplary embodiment. Constituents that have been already described will be denoted with the same reference letters or numerals and the descriptions thereof will be omitted.

An electrically erasable programmable read-only memory (EEPROM) 101a, which is a non-volatile memory, is provided in the CPU 101. The CPU 101 is connected to a read-only memory (ROM) 102, a random access memory (RAM) 103, a data memory 104, an image sensor control circuit 108, an image processing circuit 109, a display control circuit 110, and a focal plane shutter 113. The CPU 101 is also connected to the photometric sensor 122, a lens control circuit 106, the focus detection unit 119, an attitude detection circuit 127, a release SW 140, and a DC/DC converter 142. The image processing circuit 109 is connected to the image sensor control circuit 108 and the image sensor 107. In the present exemplary embodiment, the image sensor 107 has approximately 10 million (3888×2592) effective pixels. The display control circuit 110 is connected to an external display apparatus 115. The EEPROM 101a serves as an example of a storage unit according to the present invention.

The CPU 101 performs various control based on a control program stored on the ROM 102. Examples of the various control include a process of reading a captured image signal output from the image processing circuit 109 and transferring the captured image signal to the RAM 103, a process of transferring data from the RAM 103 to the display control circuit 110, and a process of compressing image data in a joint photographic experts group (JPEG) method and storing the compressed image data in a file format on the data memory 104. The CPU 101 transmits instructions including changing the number of data-loading pixels and changing digital image processing to the image sensor control circuit 108, the image processing circuit 109, the display control circuit 110, and so forth.

The focus detection unit 119 includes a pair of CCD line sensors for focus detection. The focus detection unit 119 performs A/D conversion of voltage obtained from the line sensors, and transmits the converted voltage to the CPU 101. The focus detection unit 119 also performs control of accumulation time and auto gain control (AGC) of the line sensors under the control of the CPU 101.

In addition, the CPU 101 controls the photometric sensor 122 in object detection and exposure control. Each analog electric signal of the photometric sensor 122 is converted into an 8-bit digital signal through A/D conversion by the CPU 101. The CPU 101 performs A/D conversion on R, G, and B analog signals of 640×480 (approximately 300 thousand) pixels in Bayer or stripe arrangement obtained from the photometric sensor 122 to generate digital signals, and temporarily stores these digital signals on the RAM 103. The CPU 101 generates luminance signals and signals for object detection on the basis of the output of the photometric sensor 122 stored as digital signals, and thereby performs object detection and exposure control that will be described later.

In addition, the CPU 101 outputs an instruction of image capturing following an operation of the release SW 140 and a control signal for controlling the supply of power to each device to the DC/DC converter 142.

The RAM 103 includes an image loading area 103a, a work area 103b, a video RAM (VRAM) 103c, and a temporary saving area 103d. The image loading area 103a is used as a temporary buffer for temporarily storing a captured image (YUV digital signal) transmitted from the image processing circuit 109 and JPEG-compressed image data read from the data memory 104. The image loading area 103a is used as an exclusive work area for images used for image compression and image decompression. The work area 103b is a work area for various programs. The VRAM 103c is used as a VRAM for storing display data to be displayed on the external display apparatus 115. The temporary saving area 103d is an area used for temporarily saving various data.

The data memory 104 is a flash memory for storing captured image data compressed in a JPEG method by the CPU 101, various metadata to be referred to by applications, or the like, in a file format. The data memory 104 may be other storage devices than a flash memory.

The image sensor 107 photoelectrically converts a captured image projected through the lens unit 105 into analog electric signals. The image sensor 107 is capable of outputting horizontally or vertically thinned pixel data in accordance with a resolution conversion instruction from the CPU 101.

The image sensor control circuit 108 includes a timing generator for supplying a transfer clock signal and a shutter signal to the image sensor 107 and a circuit for performing noise reduction and gain processing on a signal output from the image sensor 107. The image sensor control circuit 108 further includes an A/D conversion circuit for converting an analog signal into a 10-bit digital signal, a circuit for performing pixel thinning processing in accordance with a resolution conversion instruction from the CPU 101, and so forth.

The image processing circuit 109 performs image processing on a 10-bit digital signal output from the image sensor control circuit 108 and outputs an 8-bit digital signal in a YUV (4:2:2) format. Examples of the image processing include gamma conversion, color space conversion, white balancing, automatic exposure, and flash correction.

The display control circuit 110 controls display of the external display apparatus 115. The display control circuit 110 receives YUV digital image data transferred from the image processing circuit 109 or obtained by decompressing a JPEG image file stored on the data memory 104. The display control circuit 110 converts the received YUV digital image data into RGB digital signals and then outputs the RGB digital signals to the external display apparatus 115. The external display apparatus 115 is capable of displaying an image obtained by performing horizontal and vertical thinning on an image captured by the image sensor 107. The display control circuit 110 also drives the PN liquid crystal panel 114 and controls display on the in-finder display 118.

The battery 141 is a rechargeable secondary battery or a dry cell. The DC/DC converter 142 receives power supplied from the battery 141, generates plural power sources by performing voltage boosting and regulation, and supplies required power to respective components including the CPU 101. The DC/DC converter 142 is capable of controlling start and stop of power supply to each component in accordance with a control signal from the CPU 101.

Next, a photometry unit that measures the luminance of the shooting target field will be described by using optical elements for photometry (the photometric lens 121 and the photometric prism 126) and the photometric sensor 122. As will be described later, object detection is performed by using the optical elements for photometry and the photometric sensor 122. Thus, it is preferred that the photometric lens 121 has a good image forming performance. However, due to restriction from the viewpoint of the size and the cost of the camera, the photometric lens 121 is configured as a single lens in the present exemplary embodiment. The image forming performance and the like of the photometric lens 121 will be described in detail later.

The photometric sensor 122 includes an imaging plane (imaging surface) that receives light of an image of the shooting target field, is sensitive to two or more wavelength regions, and detects these wavelength regions, and outputs signals of respective wavelength regions in accordance with the result of detection. The wavelength regions that the photometric sensor 122 according to the present exemplary embodiment detects correspond to the three primary colors of R, G, and B. The photometric sensor 122 is, for example, a high-resolution CCD of 640 (horizontal)×480 (vertical) pixels with a pixel pitch of about 6 um, and a color filter of the three colors of R, G, and B in Bayer arrangement or stripe arrangement is disposed over the pixels. The CPU 101 is capable of obtaining a luminance signal and a chrominance signal of the shooting target field as a result of the CPU 101 or the image processing circuit 109 performing YUV conversion on the signal output from the photometric sensor 122, and the CPU 101 calculates an exposure control value by using the luminance signal. In addition, the CPU 101 combines signals output from the photometric sensor 122 by changing weights for the respective primary color signals of R, G, and B as appropriate, and performs object detection by using the signal generated as a result of the combining.

The photometric lens 121 is, for example, a lens having an image magnification of 0.15. A region that can be observed through the photometric lens 121 will be referred to as a photometric region 125. The photometric region 125 is positioned inside the finder field frame 117 and is a little smaller than the finder field frame 117 as illustrated in FIG. 2. The photometric region 125 is roughly divided into 20 (horizontal)×20 (vertical) regions (32×24 pixels per region) and used as a low-resolution sensor of 400 pixels in photometry. The luminance value of each of the 20 (horizontal)× 20 (vertical) regions is calculated by weighting RGB sensor output values of the photometric sensor 122 with a weighting coefficient uniformly set in the photometric region 125. The luminance of the shooting target field can be detected from the sum or the average of luminance values of the regions.

An exposure control value for setting a main object to an appropriate luminance is calculated by performing predetermined weighting calculation on the luminance values of the shooting target field divided into 20 (horizontal)×20 (vertical) regions obtained from the photometric sensor 122 with a selected focus detection region 124 set as a center. In exposure control, a control value of an aperture stop (not illustrated) in the lens unit 105 and a control value of a shutter speed of the focal plane shutter 113 are set on the basis of the calculated exposure control value. According to the control values, light of an amount appropriate for the object reaches the image sensor 107, and an image of a desired brightness can be captured.

The camera according to the present exemplary embodiment is provided with the release SW 140, and two levels of pressing amount thereof, that is, a first level (half pressing) and a second level (full pressing), can be detected. The first level and the second level of the release SW 140 will be hereinafter referred to as SW1 and SW2, respectively. In the case where the photographer presses the release SW 140 to SW1, focus detection and exposure control are performed, and setting of an autofocusing operation of the lens unit 105 and an exposure control value of the camera is performed. In the case where the photographer keeps pressing the release SW 140 and the release SW 140 is pressed to SW2, the main mirror 111 moves out of the path of the light beam incident through the lens unit 105, and an aperture value of the lens unit 105 and a shutter speed of the focal plane shutter 113 are controlled in accordance with a value set in the exposure control. The incident object light beam is photoelectrically converted by the image sensor 107. Then, the signal obtained through the photoelectric conversion is recorded on a recording medium as a captured image, and the captured image is displayed on the external display apparatus 115. The series of operations including the focus detection, the exposure control, and the recording of the image performed by pressing the release SW 140 is the basic operation of image capturing.

Next, an object detection unit that detects an object in the shooting target field will be described by using the optical elements for photometry and the photometric sensor 122. Object detection is performed by using the output from the photometric sensor 122, and thus the photometric region 125 serves as an object detection range. In object detection, an object should be recognized in detail. Therefore, the photometric region 125 is not regarded as the collection of roughly divided 20 (horizontal)×20 (vertical) regions as in photometry, and the photometric sensor 122 is used as a high-resolution image sensor of 640 (horizontal)×480 (vertical) pixels (approximately 300 thousand pixels).

In the present exemplary embodiment, a case where a face of a person is detected as a target of the object detection will be described. There are various methods of detecting a human face, and examples of the methods include a method of extracting a feature portion of a face, such as an eye, a nose, or a mouth, and determining whether the object is a face. In the present exemplary embodiment, face detection is performed by extracting a feature portion of a face from information for object detection obtained from the photometric sensor 122. To be noted, the target and the method of object detection according to the present invention are not limited, and any target and method of object detection may be used as long as object detection is performed by using information for object detection.

Next, axial chromatic aberration and astigmatism occurring in the photometric lens 121 due to the optical system will be described with reference to FIGS. 4A to 4D. Since object detection is performed by using the photometric lens 121, the object can be detected more finely when the image forming performance of the photometric lens 121 is higher. However, since the photometric lens 121 is configured as a single lens due to restriction from the viewpoint of the size and the cost of the camera as described above, aberration such as axial chromatic aberration and astigmatism occurs.

Figure 4A:
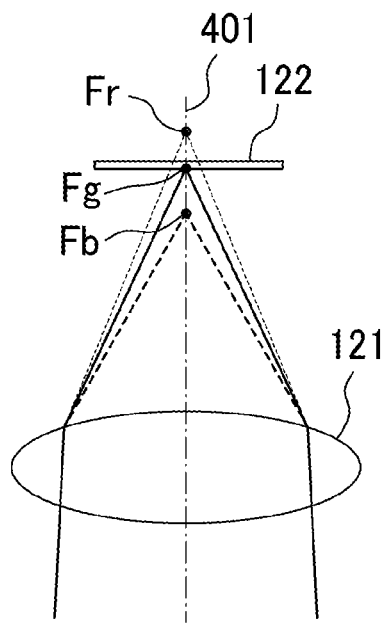
FIG. 4A illustrates axial chromatic aberration occurring in a photometric lens.

First, axial chromatic aberration will be described with reference to FIG. 4A. FIG. 4A illustrates axial chromatic aberration. Axial chromatic aberration is a kind of aberration in which an image forming position in the direction of an optical axis 401 of the photometric lens 121 is displaced in accordance with the wavelength of the light due to the variation of refractive index between wavelengths of light.

Positions Fr, Fg, and Fb illustrated in FIG. 4A respectively correspond to image forming positions of main wavelengths of R, G, and B in a region of 0 image height. The relationship between wavelengths of R, G, and B is represented by B<G<R, and the photometric lens 121 has a characteristic of having a higher refractive index for a light beam of a shorter wavelength. Therefore, the image forming position Fb of the main wavelength of B is closer to the photometric lens 121 than the image forming position Fg of the main wavelength of G is. In addition, the image forming position Fr of the main wavelength of R is farther from the photometric lens 121 than the image forming position Fg of the main wavelength of G is.

Figure 4B:
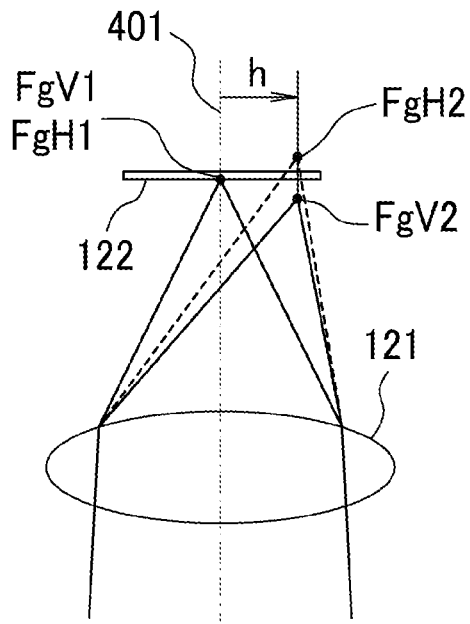
FIG. 4B illustrates astigmatism.

Next, astigmatism will be described with reference to FIG. 4B. FIG. 4B illustrates astigmatism. Astigmatism is a kind of aberration in which an image forming position is displaced in a direction parallel to the optical axis 401 in accordance with a position in a direction perpendicular to the optical axis 401 of the photometric lens 121 (a direction parallel to the imaging plane of the photometric sensor 122).

A position FgV1 corresponds to an image forming position of the main wavelength of G of the region of 0 image height in a V direction. A position FgH1 corresponds to an image forming position of the main wavelength of G of the region of 0 image height in an H direction. A position FgV2 corresponds to an image forming position of the main wavelength of G of a region of an image height of h in the V direction. A position FgH2 corresponds to an image forming position of the main wavelength of G of the region of h image height in the H direction. The V direction corresponds to a shorter side direction of the finder field frame 117 illustrated in FIG. 2, and the H direction corresponds to a longitudinal direction of the finder field frame 117.

Generally, the curvature in the V (vertical) direction and the curvature in the H (horizontal) direction of an image optical system using optical elements differ from each other in a region of a high image height. In addition, the curvatures in the V direction and the H direction coincide in the region of 0 image height.

Accordingly, in the region of 0 image height, the image forming position FgV1 and the image forming position FgH1 coincide. In addition, in the region of h image height serving as an example of the region of a high image height, the image forming position FgV2 and the image forming position FgH2 are displaced from each other in the direction parallel to the optical axis 401.

Figure 4C:
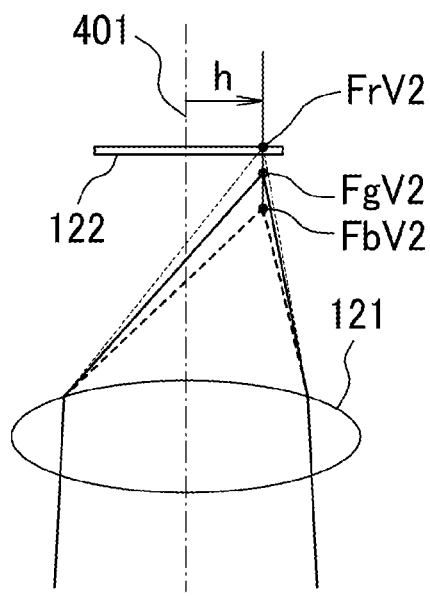
FIG. 4C illustrates image forming positions of respective primary wavelengths in a V direction in a certain region.

Next, image forming positions of main wavelengths of R, G, and B in the region of h image height in the V direction will be described with reference to FIG. 4C. FIG. 4C illustrates the image forming positions of main wavelengths of R, G, and B in the region of h image height in the V direction.

A position FrV2 corresponds to an image forming position of the main wavelength of R in the region of h image height in the V direction. The position FgV2 corresponds to the image forming position of the main wavelength of G in the region of h image height in the V direction as in FIG. 4B. A position FbV2 corresponds to an image forming position of the main wavelength of B in the region of h image height in the V direction.

As illustrated in FIG. 4C, the image forming positions FrV2, FgV2, and FbV2 are displaced from each other in the direction parallel to the optical axis 401, and the image forming position FbV2 is the closest to the photometric lens 121 while the image forming position FrV2 is the farthest from the photometric lens 121.

Figure 4D:
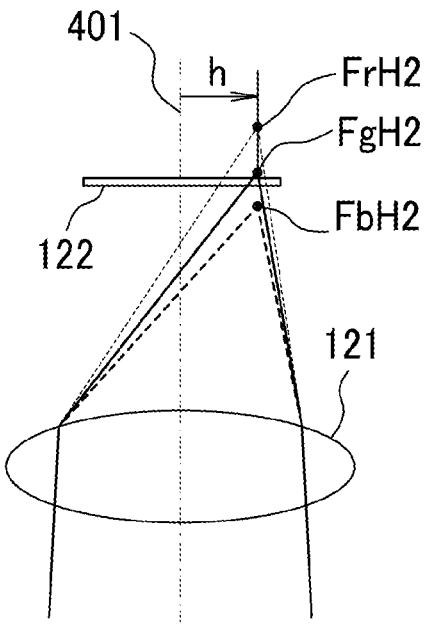
FIG. 4D illustrates image forming positions of respective primary wavelengths in an H direction in a certain region.

Next, image forming positions of main wavelengths of R, G, and B in the region of h image height in the H direction will be described with reference to FIG. 4D. FIG. 4D illustrates the image forming positions of main wavelengths of R, G, and B in the region of h image height in the H direction.

A position FrH2 corresponds to an image forming position of the main wavelength of R in the region of h image height in the H direction. The position FgH2 corresponds to the image forming position of the main wavelength of G in the region of h image height in the H direction as in FIG. 4B. A position FbH2 corresponds to an image forming position of the main wavelength of B in the region of h image height in the H direction.

As illustrated in FIG. 4D, the image forming positions FrH2, FgH2, and FbH2 are displaced from each other in the direction parallel to the optical axis 401, and the image forming position FbH2 is the closest to the photometric lens 121 while the image forming position FrH2 is the farthest from the photometric lens 121.

As can be seen from FIGS. 4C and 4D, the image forming position FrV2 does not coincide with the image forming position FrH2, and is closer to the photometric lens 121 than the image forming position FrH2 is. Similarly, the image forming position FgV2 does not coincide with the image forming position FgH2, and is closer to the photometric lens 121 than the image forming position FgH2 is. In addition, the image forming position FbV2 does not coincide with the image forming position FbH2, and is closer to the photometric lens 121 than the image forming position FbH2 is.

Next, the relationship between an image forming performance and an image forming distance will be described. The imaging forming distance is a distance between an image forming position and the imaging plane of the photometric sensor 122. The shorter the image forming distance is, the closer the image forming position becomes to the imaging plane of the photometric sensor 122. This leads to a higher image forming performance. Therefore, the image forming performance is the highest for a color whose image distance with respect the imaging plane is zero. That is, the image forming performance is the highest for a color whose image forming position is on the imaging plane of the photometric sensor 122.

In the example illustrated in FIG. 4C, in the region of h image height, the image forming distance of R color (FrV2) is the shortest with respect to the imaging plane (surface of sensor 122), the image forming distance of G (FgV2) is the second shortest, and the image forming distance of B (FbV2) is the longest in the V direction with respect to the imaging plane. Accordingly, in the region of h image height, the image forming performance of R is the highest, the image forming performance of G is the second highest, and the image forming performance of B is the lowest in the V direction.

In the example illustrated in FIG. 4D, in the region of h image height, the image forming distance of G is the shortest, the image forming distance of B is the second shortest, and the image forming distance of R is the longest in the H direction. Accordingly, in the region of h image height, the image forming performance of G is the highest, the image forming performance of B is the second highest, and the image forming performance of R is the lowest in the V direction.

Next, image data for object detection will be described. The image data for object detection is used for detecting a person in the shooting target field. The image data for object detection is luminance image data (luminance signal image) obtained by combining signals of R, G, and B output from the photometric sensor 122 at a predetermined ratio. The higher resolution the image data for object detection has, the more likely to be extracted a feature portion of the object becomes.

Next, a positional relationship between the photometric sensor 122 and the photometric lens 121 will be described.

Generally, when generating a luminance signal, calculation is performed by setting a larger weight for the G signal of the photometric sensor 122. Therefore, in the present exemplary embodiment, the positional relationship between the photometric sensor 122 and the photometric lens 121 is held by a holding member (not illustrated) or the like such that an image forming position Fg of G of the photometric lens 121 coincides with a center portion of the photometric sensor 122.

Next, a method of generating the image data for object detection will be described. When detecting an object, a feature portion of the object is detected. Therefore, it is required that the feature portion of the object is resolved better in the image data for object detection.

Since a human face is set as the object in the present exemplary embodiment, the feature portion of the object is an eye, a mouth, or the like. Patterns of an eye and a mouth are typically longer in the horizontal direction. Therefore, it can be said that a higher precision of object detection can be achieved in the case where the image data for object detection has a higher resolution in the longitudinal direction of the face.

According to this idea, a high-resolution direction in which a high resolution is to be ensured is set in directions of an image of the shooting target field, and the image data for object detection is generated so as to have a higher resolution in the high-resolution direction. In the case where the object is a human face, the longitudinal direction of the face is set as the high-resolution direction.

Figure 5A:
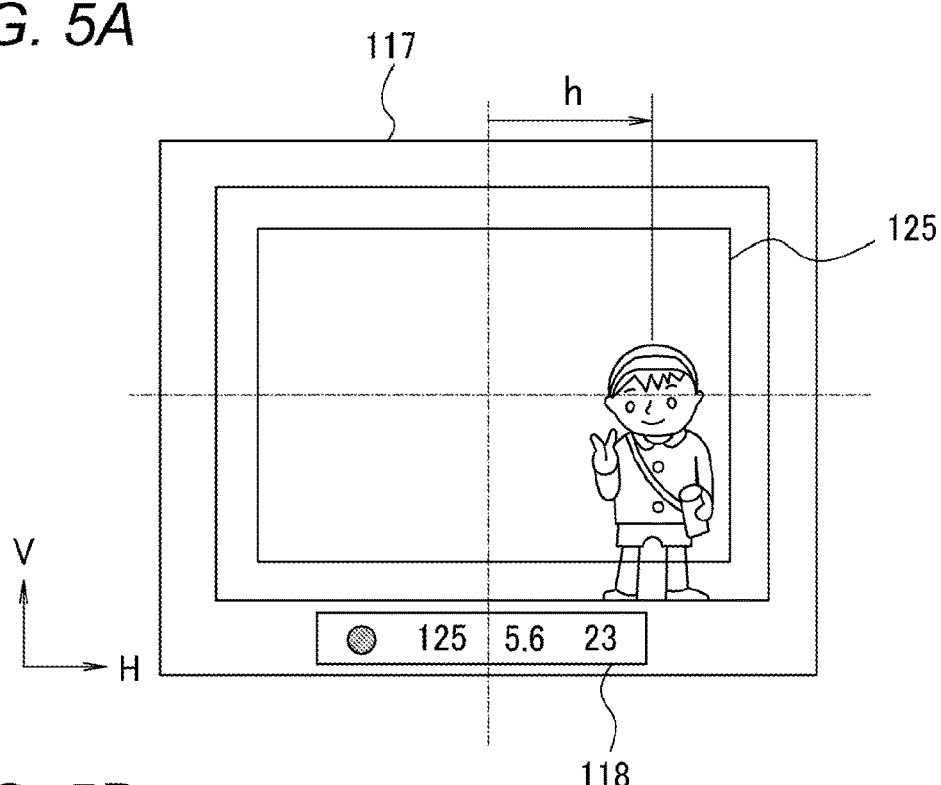
FIG. 5A illustrates a finder field frame when an attitude of the camera is set to a normal (horizontal) position.

Next, a method of generating the image data for object detection in the case where the attitude of the camera is set to a normal position will be described with reference to FIG. 5A. FIG. 5A illustrates the finder field frame 117 in the case where the attitude of the camera is set to the normal position. The normal position corresponds to an attitude of the camera in which the direction of gravity (vertical direction) in an image of the shooting target field coincides with the shorter side direction of the finder field frame 117.

In FIG. 5A, an image of the shooting target field is displayed in the finder field frame 117. In this image of the shooting target field, a person is present in the region of h image height illustrated in FIGS. 4B to 4D. As illustrated in FIG. 5A, in the case where the attitude of the camera is set to the normal position, it is assumed that shooting is often performed such that the longitudinal direction of a human face coincides with the vertical direction. Thus, in the case where the attitude of the camera is set to the normal position, the V direction that corresponds to the longitudinal direction of the face is set as the high-resolution direction, and image data for object detection that has a high resolution in the V direction is generated.

That is, in the framing illustrated in FIG. 5A, object detection precision can be increased by setting a larger weight for a color having a higher image forming performance in the V direction to generate image data for object detection having a high resolution in the V direction. Accordingly, for example, in the region of h image height, the camera according to the present exemplary embodiment generates the image data for object detection by setting the largest weight for R, which is the color having the highest image forming performance in the V direction as described above.

Figure 5B:
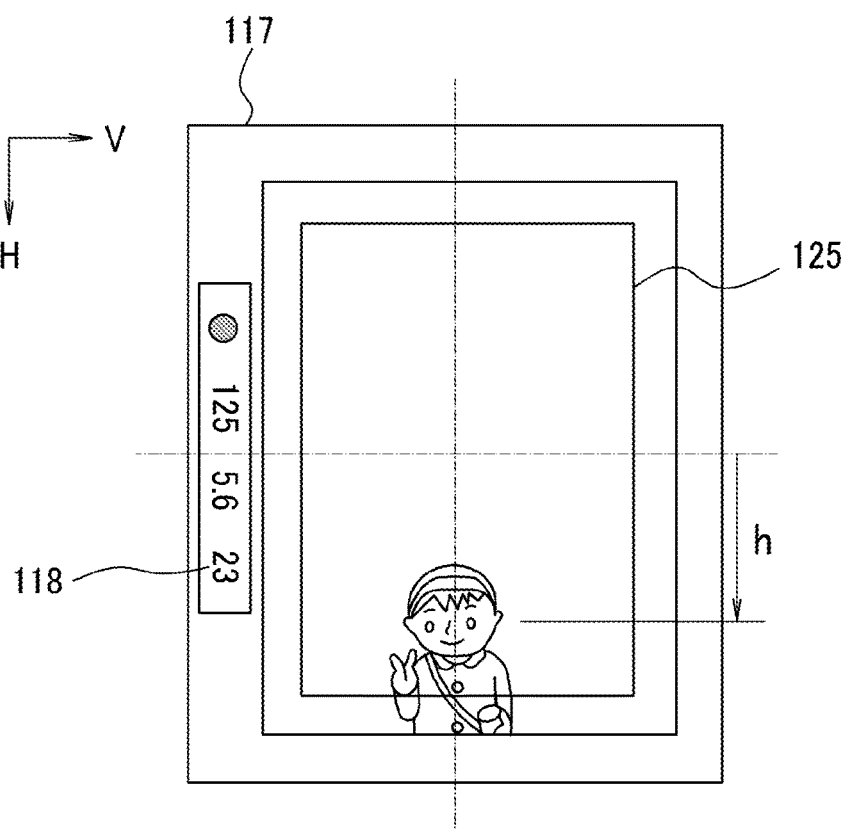
FIG. 5B illustrates the finder field frame when the attitude of the camera is set to a vertical position.

Next, a method of generating the image data for object detection in the case where the attitude of the camera is set to a vertical position will be described with reference to FIG. 5B. FIG. 5B illustrates the finder field frame 117 in the case where the attitude of the camera is set to the vertical position. To be noted, the vertical position corresponds to an attitude of the camera in which the vertical direction in an image of the shooting target field coincides with the longitudinal direction of the finder field frame 117.

In FIG. 5B, an image of the shooting target field is displayed in the finder field frame 117. In this image of the shooting target field, a person is present in the region of h image height illustrated in FIGS. 4B to 4D. As illustrated in FIG. 5B, in the case where the attitude of the camera is set to the vertical position, it is assumed that shooting is often performed such that the longitudinal direction of a human face coincides with the vertical direction. Thus, in the case where the attitude of the camera is set to the vertical position, the H direction that corresponds to the longitudinal direction of the face is set as the high-resolution direction, and image data for object detection that has a high resolution in the H direction is generated.

That is, in the framing illustrated in FIG. 5B, object detection precision can be increased by setting a larger weight for a color having a higher image forming performance in the H direction to generate image data for object detection having a high resolution in the H direction. Accordingly, for example, in the region of h image height, the camera according to the present exemplary embodiment generates the image data for object detection by setting the largest weight for G, which is the color having the highest image forming performance in the H direction as described above.

As described above, object detection precision becomes higher as the image data for object detection has a higher resolution in the V direction in the framing illustrated in FIG. 5A and a higher resolution in the H direction in the framing illustrated in FIG. 5B.

Here, it is assumed that the image data for object detection for the region of h image height illustrated in FIGS. 4B to 4D is generated by setting the largest weight for G in both cases of the framing illustrated in FIG. 5A and the framing illustrated in FIG. 5B. In this case, as illustrated in FIGS. 4C and 4D, the image forming distance of G in the H direction (distance between the image forming position FgH2 and the imaging plane of the photometric sensor 122) is shorter than the image forming distance of G in the V direction (distance between the image forming position FgV2 and the imaging plane of the photometric sensor 122). Thus, G has a higher resolution in the H direction than in the V direction. Accordingly, the object detection precision in the framing of FIG. 5B is higher than the object detection precision in the framing of FIG. 5A.

As can be seen from the description above, the camera according to the present exemplary embodiment performs weighting on the output of color signals from the photometric sensor 122 in accordance with the attitude of the camera such that image data for object detection having a high resolution is generated. Thus, it becomes possible to improve the detection precision of an object, particularly a person, for any attitude of the camera.

Next, detection of the attitude of the camera will be described. The attitude detection circuit 127 is capable of detecting the inclination of the housing to which the attitude detection circuit 127 is attached by measuring the gravity. In the present exemplary embodiment, whether the attitude of the camera is set to the normal position described with reference to FIG. 5A or the vertical position described with reference to FIG. 5B can be determined from the output of the attitude detection circuit 127 in the case where the attitude of the camera is changed, for example, on the intention of the photographer.

The CPU 101 determines the high-resolution direction on the basis of the output from the attitude detection circuit 127, and generates the image data for object detection such that the image data have a high resolution in the high-resolution direction. Thus, improvement of the object detection precision can be expected for any attitude of the camera.

Next, a weighting table 701 will be described. As has been described with reference to FIGS. 4A to 4D, the photometric lens 121 has astigmatism in which an image forming position in the V direction and an image forming position in the H direction are displaced from each other. Therefore, in the case where the attitude of the camera is changed on the intention of the photographer or the like, it is important to generate the image data for object detection by changing the weight for each color in accordance with the high-resolution direction determined on the basis of the attitude of the camera.

In the present exemplary embodiment, the weighting table 701 stores information about the weight for each color and is used for changing the weight for each color in accordance with the attitude of the camera. As the weighting table 701, a first weighting table 701A and a second weighting table 701B are provided. The CPU 101 changes the weight for each color by switching the weighting table 701 for use in accordance with the attitude of the camera, and thus generates the image data for object detection. Specifically, the first weighting table 701A is used in the case where the attitude of the camera is set to the normal position and the V direction is the high-resolution direction. The second weighting table 701B is used in the case where the attitude of the camera is set to the vertical position and the H direction is the high-resolution direction. Each weighting table 701 stores information about the weight for each color and each region 601.

The first weighting table 701A and the second weighting table 701B are stored in, for example, the EEPROM 101a in the CPU 101.

Figure 6:
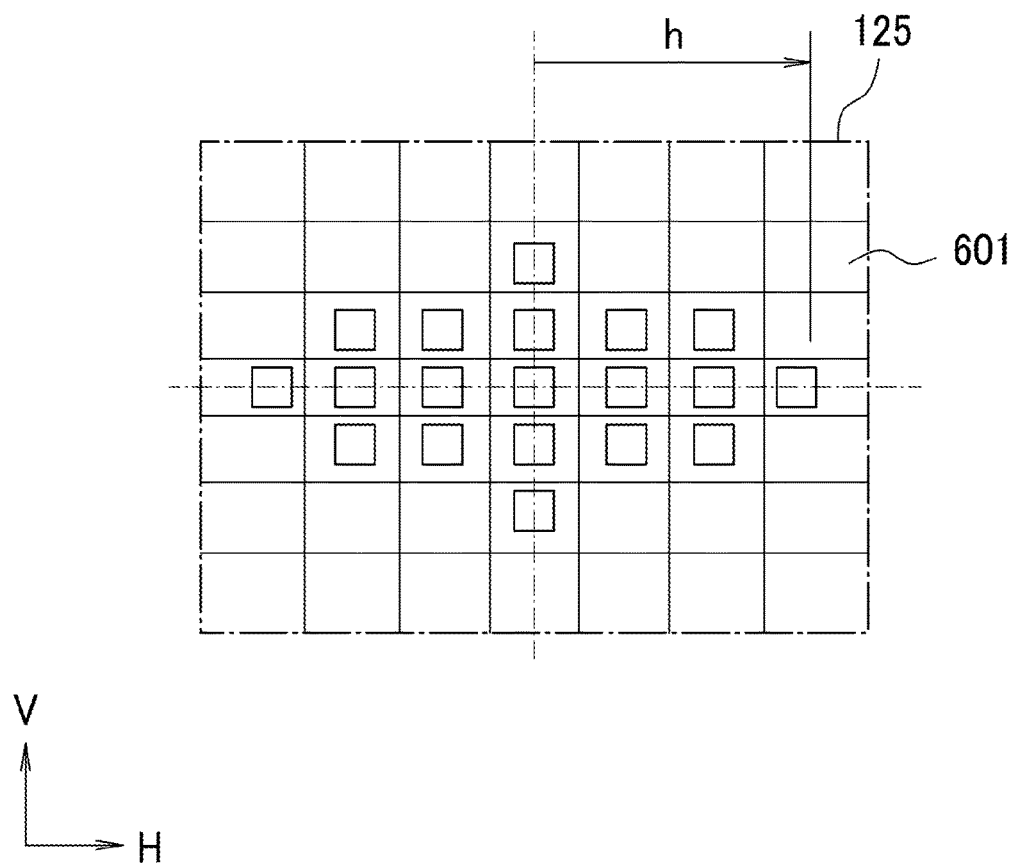
FIG. 6 illustrates image regions in a shooting target field.

To describe the weighting table 701 in detail, regions of an image of the shooting target field will be first described with reference to FIG. 6. FIG. 6 illustrates regions 601 of an image of the shooting target field. As illustrated in FIG. 6, in the camera according to the present exemplary embodiment, the photometric region 125 is divided into predetermined imaginary regions 601. In the present exemplary embodiment, the photometric region 125 is divided into 7 regions in the V direction and 7 regions in the H direction, that is, 49 regions in total. As illustrated in FIGS. 5A and 5B and so forth, an image of the shooting target field is formed in the photometric region 125, and thus the imaginary regions 601 of the photometric region 125 can be regarded as imaginary regions 601 of the image of the shooting target field.

Next, the weighting table 701 will be described with reference to FIGS. 7A to 7C. FIG. 7A illustrates the regions 601 each assigned with an identification code. FIG. 7B illustrates the first weighting table 701A. FIG. 7C illustrates the second weighting table 701B. A region assigned with an identification code SNN will be hereinafter referred to as an SNN region.

The aberration of the optical system has a rotation symmetry with respect to the optical axis. In the present exemplary embodiment, an S41 region corresponds to the optical axis 401. In this configuration, regions positioned rotation-symmetrically from each other with respect to the S41 region are optically equivalent, and the same information of the weight for each color can be used therefor. In FIG. 7A, regions positioned rotation-symmetrically from each other with respect to the S41 region are assigned with the same identification code. The same information about the weight for each color is used for regions assigned with the same identification code. Therefore, 16 pieces of information about the weight for each color are required in total for S11 regions to S44 regions as illustrated in FIG. 7A.

The weighting table 701 is an exemplary weighting table used in the case where the photometric sensor 122 and the photometric lens 121 are in such a positional relationship as illustrated in FIG. 4A. The first weighting table 701A and the second weighting table 701B store weighting coefficients for each color as the information about the weight for each color. A larger weighting coefficient indicates a larger weight used in calculation. Weighting coefficients Wr, Wg, and Wb are weighting coefficients that are respectively multiplied by primary color signals of R, G, and B of the photometric sensor 122 in generation of the image data for object detection. The CPU 101 multiplies the respective primary color signals of R, G, and B of the photometric sensor 122 by the weighting coefficients Wr, Wg, and Wb obtained from the weighting table 701 to generate luminance image data. The luminance image data is used as the image data for object detection.

The weighting coefficients Wr, Wg, and Wb stored in the weighting table 701 are determined in accordance with the following idea. That is, for each region, a weighting coefficient for a color having the highest image forming performance in the predetermined high-resolution direction is set to be larger than weighting coefficients for the other colors. In addition, for each region, a weighting coefficient for a color having the second highest image forming performance in the predetermined high-resolution direction is set to be larger than a weighting coefficient for a color having the lowest image forming performance.

For example, since the image forming position of G coincides with the center of the photometric sensor 122 regardless of the attitude of the camera being set to the normal position or the vertical position as described above, the image forming performance of G is higher than the image forming performances of B and R in the S41 region that is close to the optical axis 401. Therefore, in the first weighting table 701A and the second weighting table 701B, the weighting coefficient Wg for G is larger than the weighting coefficients Wr and Wb for the other colors for the S41 region.

In addition, since the image forming position does not vary between the H direction and the V direction as described above in the S41 region close to the optical axis 401, the weighting coefficients Wr, Wg, and Wb for the S41 region are all the same between the first weighting table 701A and the second weighting table 701B.

Next, an example of the region of h image height illustrated in FIGS. 4B to 4D and FIGS. 5A and 5B will be described. S44 regions correspond to the region of h image height.

In the framing of FIG. 5A, the V direction is the high-resolution direction. Thus, a larger weight coefficient is set for a color having a higher image forming performance in the V direction. Specifically, in S44 regions and in the V direction, the image forming performance of R is the highest, the image forming performance of G is the second highest, and the image forming performance of B is the lowest. Therefore, among weight coefficients for the S44 regions stored in the first weighting table 701A that is used in the case where the V direction is the high-resolution direction, the weighting coefficient Wr is the largest, the weighting coefficient Wg is the second largest, and the weighting coefficient Wb is the smallest.

In the framing of FIG. 5B, the H direction is the high-resolution direction. Thus, a larger weight coefficient is set for a color having a higher image forming performance in the H direction. Specifically, in S44 regions and in the H direction, the image forming performance of G is the highest, the image forming performance of B is the second highest, and the image forming performance of R is the lowest. Therefore, among weight coefficients for the S44 regions stored in the second weighting table 701B that is used in the case where the H direction is the high-resolution direction, the weighting coefficient Wg is the largest, the weighting coefficient Wb is the second largest, and the weighting coefficient Wr is the smallest.

In the second weighting table 701B, the weighting coefficient Wg for the S44 regions is a little smaller than the weighting coefficient Wg for the S41 region, which is a central portion. In addition, the image forming performance of B is a little higher in the H direction in the S44 regions than in the S41 region, and the weighting coefficient Wb for the S44 regions is larger than the weighting coefficient Wb for the S41 region in the second weighting table 701B.

In the present exemplary embodiment, the weighting coefficient is determined for each region by using the weighting table 701 as described above. However, the weighting coefficient may be determined by not using the weighting table 701 but using a function to calculate the weighting coefficient from the image height. In this case, the function is provided, for example, for each high-resolution direction. In addition, a uniform weighting coefficient may be determined for the whole region of the image of the shooting target field in accordance with the high-resolution direction.

Figure 8:
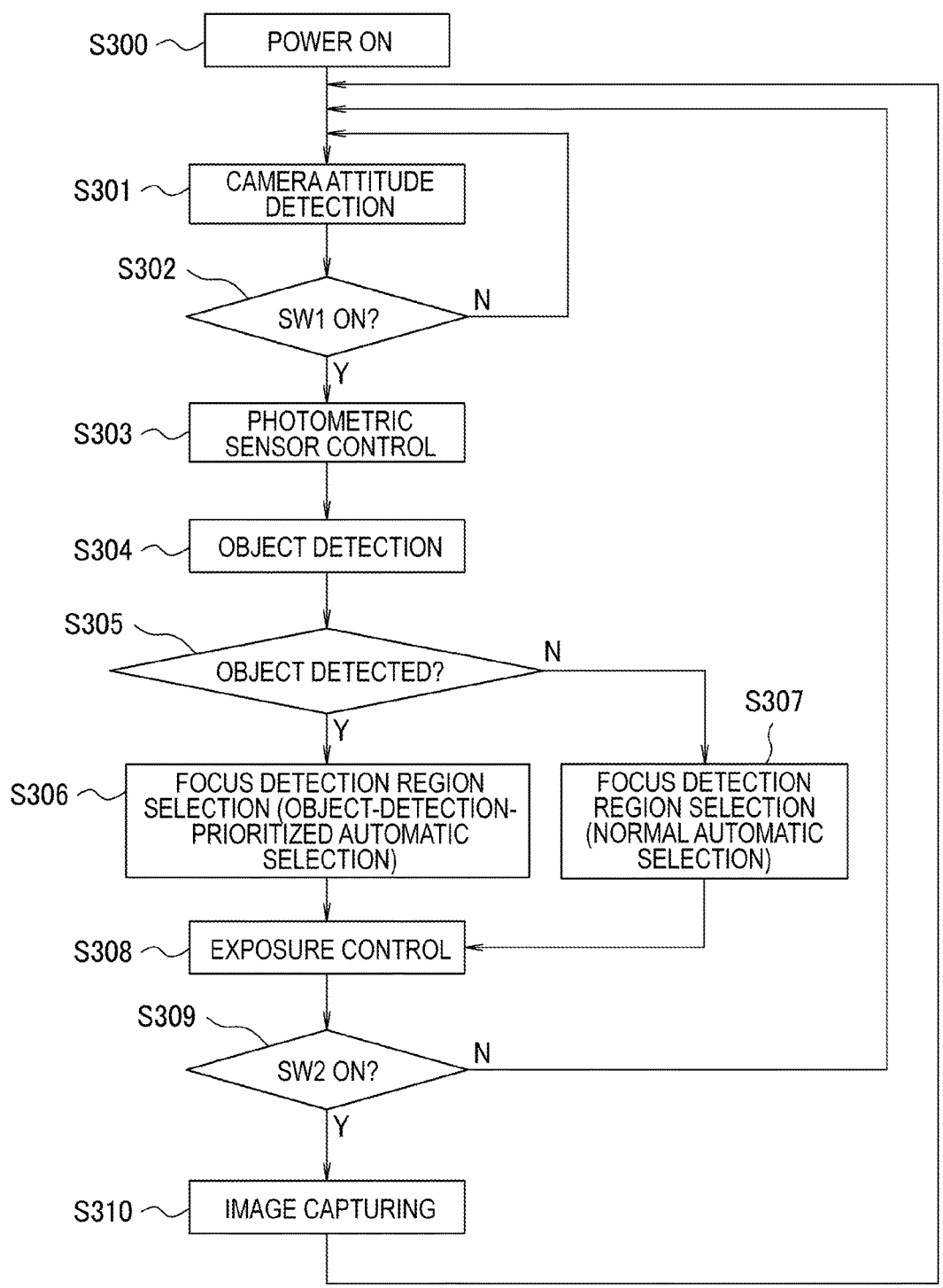
FIG. 8 is a flowchart of an image capturing process of the camera.

Next, an operation of the camera according to the present exemplary embodiment will be described with reference to FIG. 8. FIG. 8 is a flowchart of image capturing processing of the camera according to the present exemplary embodiment.

In step S300, a power switch (not illustrated) is turned on when the camera according to the present exemplary embodiment is not operating, and the camera starts an image capturing operation. To be noted, in the flowchart of FIG. 8, the automatic selection operation is selected for focus detection of the lens unit 105.

In step S301, the CPU 101 detects whether the attitude of the camera is set to the normal position or the vertical position on the basis of the output of the attitude detection circuit 127. In the case where the attitude of the camera is set to the normal position, the CPU 101 determines to use the first weighting table 701A because the V direction is the high-resolution direction. In the case where the attitude of the camera is set to the vertical position, the CPU 101 determines to use the second weighting table 701B because the H direction is the high-resolution direction.

In step S302, the CPU 101 determines whether the release SW 140 has been pressed to SW1. In the case where the release SW 140 has been pressed to SW1, the CPU 101 advances the processing to step S303, and, in the case where the release SW 140 has not been pressed to SW1, the CPU returns the processing to step S301.

In step S303, the photometric sensor 122 starts accumulation in accordance with an instruction from the CPU 101. The CPU 101 converts analog signals output from the photometric sensor 122 into digital signals and temporary stores the digital signals on the VRAM 103c.

In step S304, the CPU 101 generates the image data for object detection from the digital signals stored on the VRAM 103c in step S303. The CPU 101 generates luminance image data as the image data for object detection from the digital signals stored on the VRAM 103c by using the weighting coefficients stored in the weighting table 701 determined in step S301. This generation of the image data for object detection serves as an example of processing by a generation unit according to the present invention.

Further in step S304, the CPU 101 extracts a feature portion of a face, such as an eye or a mouth, from the generated image data for object detection, and thereby detects an object such as a face. This detection of the object serves as an example of processing by an object detection unit according to the present invention.

In step S305, the CPU 101 determines whether an object has been detected from the image data for object detection. In the case where an object has been detected, the CPU 101 advances the processing to step S306, and, in the case where no object has been detected, the CPU 101 advances the processing to step S307.

In step S306, the CPU 101 transmits a coordinate of the object detected in step S304 to the focus detection unit 119. The focus detection unit 119 performs the object-detection-prioritized automatic selection operation described above in the vicinity of the object on the basis of the coordinate of the object.

In step S307, the focus detection unit 119 performs the normal automatic selection operation described above.

In step S308, the CPU 101 calculates luminance information in which the output of the photometric sensor 122 temporarily stored in step S303 is divided into 20×20 regions. This calculation of luminance information serves as an example of processing by a luminance calculation unit according to the present invention.

Then, predetermined algorithm calculation such as weighting is performed on the focus detection region 124 selected in step S306 or S307. In this way, the CPU 101 calculates the aperture value of the lens unit 105 and the shutter speed of the focal plane shutter 113, which determine an exposure value of the camera. Then, the CPU 101 controls the aperture value of the lens unit 105 and the shutter speed of the focal plane shutter 113 by using the result of the calculation. This control is an example of processing by a control unit according to the present exemplary embodiment.

In step S309, the CPU 101 determines whether the release SW 140 has been pressed to SW2. In the case where the release SW 140 has been pressed to SW2, the CPU 101 advances the processing to step S310, and, in the case where the release SW 140 has not been pressed to SW2, the CPU 101 returns the processing to step S301.

In step S310, the CPU 101 transmits a signal to each of a shutter control circuit, an aperture driving unit, and the image sensor control circuit 108, and performs a known image capturing operation. The CPU 101 returns the processing to step S301 after finishing the image capturing operation.

As described above, the camera according to the present exemplary embodiment sets a larger weight for a color having a higher image forming performance in the high-resolution direction than the other colors having lower image forming performances, and generates the image data for object detection on the basis of the signals output from the photometric sensor 122. Thus, the camera according to the present exemplary embodiment can generate the image data for object detection that has a high resolution in the high-resolution direction, and can thereby suppress lowering of the object detection precision.

In addition, when a human face or the like is set as the object, it is important that the image data for object detection has a high resolution in a certain direction. Here, the camera according to the present exemplary embodiment determines the high-resolution direction serving as the certain direction on the basis of the attitude of the camera detected by the attitude detection circuit 127. Accordingly, the image data for object detection becomes suitable for detection of the object such as a human face, and object detection can be performed at a high precision.

In addition, the camera according to the present exemplary embodiment generates the image data for object detection by performing weighting of colors for each region. Thus, the image data for object detection that has a high resolution in the high-resolution direction in the whole region thereof can be generated.

In addition, the camera according to the present exemplary embodiment performs weighting on each color by using the weighting coefficients included in the weighting table 701 on the basis of the high-resolution direction. Accordingly, the camera according to the present exemplary does not need to obtain the weighting coefficients by calculation, and thus the computational load is reduced.

In addition, the camera according to the present exemplary embodiment performs photometry by calculating the luminance of the shooting target field on the basis of the signals output from the photometric sensor 122. That is, the photometric sensor 122 is used for two purposes of photometry and object detection. Here, the photometric lens 121 is configured as a single lens due to restriction from the viewpoint of costs or the like, and thus does not necessarily have a good image forming performance in some cases. However, even in this case, the image data for object detection that has a high resolution in the high-resolution direction and is suitable for detection of an object can be generated. Therefore, lowering of the object detection precision can be suppressed.

Although the V direction or the H direction is set as the high-resolution direction in the exemplary embodiment described above, other directions may be set as the high-resolution direction. For example, in the case where the attitude of the camera is set to an inclined position, an inclined direction may be set as the high-resolution direction. The inclined position corresponds to an attitude in which the camera is inclined by, for example, 45°, with respect to the vertical direction. The inclined direction corresponds to a direction inclined by 45° from the V direction and the H direction. In the case where the inclined direction is set as the high-resolution direction, for example, a weighting table 701 corresponding to the inclined direction is used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-058493, filed Mar. 23, 2016, which is hereby incorporated by reference herein in its entirety.

What is claimed is:

1. An image capturing apparatus comprising:
an image sensor including an imaging plane that receives an image of a shooting target field through color filters according to two or more wavelength regions and outputs a signal of the image of the shooting target field;
an attitude detection circuit configured to detect an attitude of the image capturing apparatus; and
a processor configured to set a larger weight for a wavelength region having a higher image forming performance than for a wavelength region having a lower image forming performance in accordance with a direction based on the attitude of the image capturing apparatus detected by the attitude detection circuit, generate image data based on the signal output by the image sensor, and detect an object in the generated image data.

2. The image capturing apparatus according to claim 1, wherein, in a case where a first image forming distance is shorter than a second image forming distance, the processor sets a larger weight for a first wavelength region than for a second wavelength region, and, in a case where the second image forming distance is shorter than the first image forming distance, the processor sets a larger weight for the second wavelength region than for the first wavelength region,
wherein the first wavelength region is one of the wavelength regions and the second wavelength region is one of the wavelength regions that is different from the first wavelength region, and
wherein the first image forming distance is a distance between an image forming position of the first wavelength region and the imaging plane in the high resolution direction, and the second image forming distance is a distance between an image forming position of the second wavelength region and the imaging plane in the direction.

3. The image capturing apparatus according to claim 1, wherein the processor sets weights for the wavelength regions for each of plural regions constituting the image of the shooting target field.

4. The image capturing apparatus according to claim 2, further comprising a data memory configured to store, for each of plural directions and for each of plural regions constituting the image of the shooting target field, a table including information about weighting for the wavelength regions,
wherein the processor sets the weights for the wavelength regions based on the direction and by using the information about weighting included in the table.

5. The image capturing apparatus according to claim 1, wherein the image sensor is a photometric image sensor for measuring a luminance of the shooting target field.

6. The image capturing apparatus according to claim 5, wherein the processor controls at least one of an aperture value or a shutter speed based on the luminance of the shooting target field measured by the photometric image sensor.

7. The image capturing apparatus according to claim 1, further comprising:

an optical element configured to change an optical path of light incident from an outside; and a lens configured to form an image of the light whose optical path has been changed by the optical element on the image sensor.

8. A method of controlling an image capturing apparatus having an image sensor including an imaging plane that receives an image of a shooting target field through color filters according to two or more wavelength regions and outputs a signal of the image of the shooting target field, and an attitude detection circuit configured to detect an attitude of the image capturing apparatus, the method comprising:

generating, by setting a larger weight for a wavelength region having a higher image forming performance than for a wavelength region having a lower image forming performance in accordance with a direction based on the attitude of the image capturing apparatus detected by the attitude detection circuit, image data based on the signal output by the image sensor; and detecting an object in the image data generated in the generating.

* * * * *